Sept. 7, 1926.  J. B. PAUL  1,598,743
FLUSH VALVE
Filed April 9, 1926
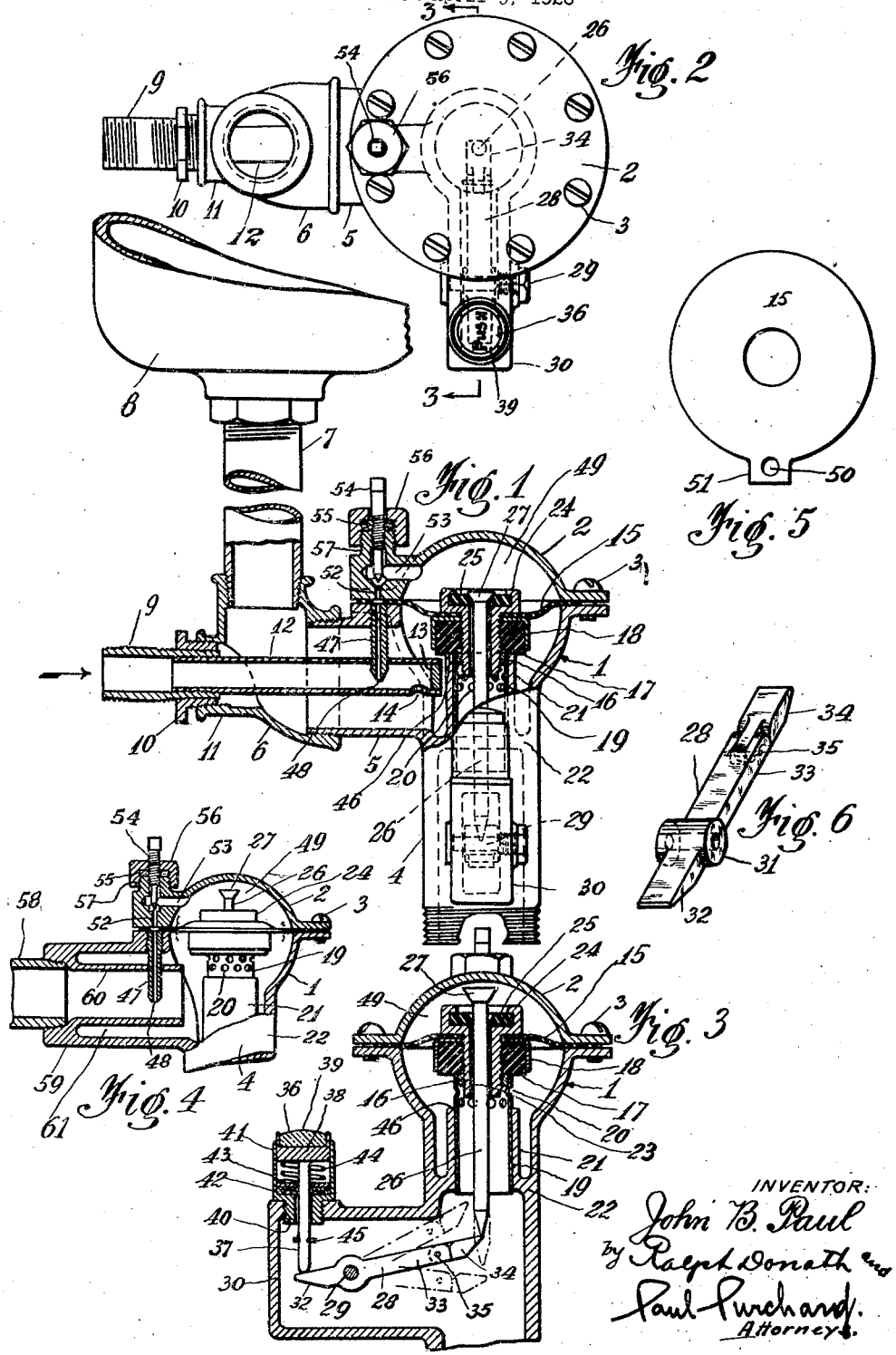

Patented Sept. 7, 1926.

1,598,743

UNITED STATES PATENT OFFICE.

JOHN B. PAUL, OF PITTSBURGH, PENNSYLVANIA.

FLUSH VALVE.

Application filed April 9, 1926. Serial No. 100,822.

This invention relates to valves and more in particular to closet flush-valves of the diaphragm type.

The primary object of this invention is to provide a valve of this character which will greatly reduce the amount of water required for properly flushing water closets or urinals. Another object is to provide a valve which is practically noiseless and very quick acting. A further object of this invention is to provide a valve wherein the amount of water delivered at each flushing may be readily adjusted without requiring taking the valve apart. Still another object is to provide a valve which is durable, simple in construction and manufacture and which is practically fool proof against abuse.

Additional features and advantages of this invention will appear from the following description considered in connection with the accompanying drawing forming a part of this application and in which:

Fig. 1 is a side elevation, mostly in section, of a flush-valve built in accordance with my invention.

Fig. 2 is a top plan view of Fig. 1, with the tank omitted.

Fig. 3 is a cross-sectional view taken on line 3—3 in Fig. 2.

Fig. 4 is a fractional cross-section showing a modified valve-construction.

Fig. 5 is a plan view of the diaphragm used in my valve.

Fig. 6 is a perspective view showing a valve lifting lever preferably used in the valve.

Reference being had to the drawing, it will be noted that the flush-valve comprises a body portion 1 and a cap or cover 2, both parts being flanged at their joining ends and secured together by means of screws 3. The body portion is provided with a vertical discharge pipe 4 and a horizontal inlet pipe 5 to which is screwed the back outlet elbow-connection 6 in which is screwed a vertical pipe 7 leading to a hermetically closed tank 8 in which air and the flushing-water are stored, the former fluid being compressed to the same pressure as that of the flushing-water. The latter is introduced into the valve through a pipe nipple 9 which connects to the main water supply line and which enters the elbow 6 through the pipe-bushing 10, screwed into the back outlet 11. Secured into said nipple is the inlet tube 12 which is closed at its inner end by a plug 13 and which has at its lower side an aperture 14 for the discharge of water from the main supply line.

The flow of water into a water-closet or urinal is controlled by means of the following mechanism:

Securely clamped between the body portion 1 and the cap 2 is a diaphragm 15 of resilient material, such as rubber, on the underside of which are centrally secured by means of a threaded plug 16, a resilient valve-disc 17 which is enclosed in a metal ferrule 18, and a guide sleeve 19 having at its upper part, adjacent the valve disc, a series of apertures 20 disposed all around said sleeve and at various levels. This sleeve fits slidably in a hub 21 the base 22 of which is cast integrally with the body thereby dividing the vertical discharge pipe into two compartments.

The threaded plug 16 has a central aperture 23 and is also provided with a head 24 which is counter-bored to accommodate a rubber washer 25. Passing through this plug is a loosely fitting plunger-pin 26 having at the top a conical head 27 acting as a valve disc upon said rubber washer. This plunger pin may be lifted from the outside of the valve-body by means of a lever 28 rockably mounted on a pin 29 and placed within a housing 30, cast laterally on the vertical discharge pipe 4 and in communication with the lower compartment thereof. As shown especially in Fig. 6, this lever comprises a hub 31 having a rear arm 32 and a front arm 33; the outer end of the latter is preferably bifurcated to receive therebetween the lifting finger 34 hingedly connected thereto by means of the pin connection 35. This lever is operated from the outside by means of a push-button 36 comprising a push-rod 37 resting upon the rear arm 32 and surmounted with a hollowed head 38 in which a porcelain button 39 bearing a suitable notice, such as "Push", is preferably inserted. The push-button is guided for vertical movement by a threaded plug 40 the enlarged head 41 of which is suitably counterbored to slidably receive the head 38 and in which are also provided a packing washer 42, a metal washer 43 and the compression spring 44 the purpose of which is to return the push-button into its raised, inoperative, position and also to exert a moderate pressure on the packing washer to insure a leak proof seal around the push-rod 37. A stop-pin 45 is driven through said rod to limit the upper travel of the push-button.

The amount of water discharged by the flush-valve is regulated by varying the time required by the valve disc 17 to seat itself tightly upon the valve-seat 46 formed on the top of the hub 21. To this end, a threaded plug 47, having a central port hole 48 is screwed through the top flange of the body portion and through the top side of the inlet tube 12, so that the pointed end of said plug will reach below the center of the inlet-tube. This is done to prevent, in a great measure, the clogging of said port-hole by floating foreign matter carried by the water. This port-hole communicates with the chamber 49 above the diaphragm by means of an aperture 50 cut in the tab 51 of the diaphragm 15 and the connecting port holes 52 and 53 drilled at right angles in the cover. The flow of water through the port-holes is adjusted by means of a threaded needle valve 54, of usual design, which may be screwed toward and away from the top of the hole 52. Any escape of water at the needle valve is prevented by means of the packing 55 which is compressed by the packing nut 56 screwed on the extension 57 provided on the cap 2.

If desired, the storage tank 8 may be dispensed with by slightly modifying the construction of the flush-valve in the manner shown in Fig. 4. As shown therein, the main supply line 58 is screwed directly into the modified inlet pipe 59. Within the latter is the inlet tube 60 of reduced diameter and open at the inner end. The annular space 61 formed between these parts acts as a small reservoir for the air compressed by the water, when the valve is closed. This compressed air acts as a cushioning means for the valve whereby a smooth and noiseless operation is obtained. The other parts of the valve being similar to those above described, they have been identified by the same reference numbers.

Having described the various parts of the flush-valve, its operation will be readily understood; it is as follows:—Assuming that the valve be connected to a water supply line and that it be in inoperative, or closed, position, it will be seen that water under pressure will fill the upper part of the body portion 1 as well as the chamber 49. The valve disc 17 will be pressed firmly on its seat 46 because of the fact that the area exposed to the water pressure is greater on the top side of the diaphragm than on the underside thereof, the difference being substantially equal to the area covered by the hub 21.

To flush a closet, for instance, the push button is depressed whereby the plunger pin is raised and the water in the chamber 49 is allowed to empty through the annular space between said plunger pin and the aperture 23. The water pressure above the diaphragm is thus released and the latter is lifted up by the water pressure acting below it. This, of course, lifts the disc 17 off its seat and the guide-sleeve 19 is also raised. The water contained in the storage tank then escapes through the many apertures 20 provided in the guide sleeve and passes through the vertical pipe 4 into the water closet bowl to which said vertical pipe is connected. This discharge of water from the tank is very rapid owing to the action of the compressed air confined therein. While the valve is open, a certain amount of water from the main supply line will also flow through the reduced aperture 14 into the closet bowl, but this amount is very small as compared to the flow from the tank.

The plunger pin 26 remains open only a sufficient time to allow the water in the chamber 49 to run out, then it drops down onto its rubber seat 25 and closes the aperture 23. The chamber 49 is then again filled with water from the main supply pipe by way of the port holes 47, 52 and 53. This creates a back pressure on the diaphragm which pushes the valve disc 17 onto its seat 46, thereby closing the flush-valve. The water from the main supply pipe keeps on flowing through the aperture 14 and backs up into the storage tank until the air compressed therein assumes a pressure equal to that of the supply water. The valve is then ready for another flushing.

In a valve of my invention, the lift of the diaphragm is made much greater than is ordinarily the practice; this is done for the purpose of letting the flush-water pass through the several holes 20 in the guide sleeve 19, so that the flush-washer is subdivided into several small streams whereby a practically noiseless flow is obtained. Moreover, the closing of the valve is also made noiseless by the gradual reduction of the flow through said sleeve apertures.

Referring to Figs. 1 and 3 especially, it will be noted that water from the tank or the main supply line will flow into the bowl as long as the plunger pin 26 remains lifted. To prevent any waste of water and limit the amount thereof delivered to a predetermined quantity at each flushing, the construction of the lever 28 shown in the drawing is used. It will be noted that this lever will leave the pin after the latter is lifted a sufficient amount and thus allow said pin to drop back onto its seat, regardless of whether or not the push button 36 is held down to the full extent and the lever brought in its highest position shown in dot and dash lines in Fig. 3. When the push button is released, the lever will assume its lowest position also shown in dot and dash line.

In order to allow for the end of the lever to drop past the plunger pin, it is necessary to provide said lever with the articulated finger 34 which is adapted for counterclockwise rotation only.

A further advantageous feature of my valve is that it will prevent any loss of water in case that the diaphragm should become leaky, since in that case water from the main supply line would simply enter into the chamber 49 and keep the valve closed, for reasons explained above.

Many changes in the precise construction, arrangement and combination of the various parts may be made without exceeding the scope of the claims, and I reserve the liberty of making all such changes as may be found advisable after prolonged use.

I claim:—

1. In a flush-valve, the combination of a valve-body; a cover therefor; a diaphragm positioned intermediate said body and cover; a container for air and water in communication with said valve; a supply pipe adapted to supply water to said container indirectly by first discharging said water into said valve, and adjustable means to discharge a predetermined amount of water in ssaid container through said valve.

2. In a flush-valve, the combination of a valve body having an inlet pipe and a discharge pipe; a cover for said body; a diaphragm positioned intermediate said body and cover; a container for air and water in communication with said valve; a supply tube adapted to supply water to said container indirectly by first discharging said water into said valve; a valve disc positioned on the lower side of said diaphragm; a seat for said disc; a plug adapted to secure said disc to said diaphragm; said plug having a central aperture; a plunger-pin loosely slidable in said aperture and having a head adapted to close said aperture; means to introduce water from the supply pipe above said diaphragm, and means to lift said plunger-pin to discharge the water above said diaphragm into said discharge pipe.

3. In a flush-valve, the combination of a valve-body having an inlet pipe and a discharge pipe; a cover for said body; a diaphragm positioned intermediate said body and cover; a container for air and water in communication with said valve; a supply tube adapted to supply water to said container indirectly by first discharging said water into said valve; a valve disc positioned on the lower side of said diaphragm; a seat for said disc; a plug adapted to secure said disc to said diaphragm; said plug having a central aperture; a plunger-pin loosely slidable in said aperture and having a head adapted to close said aperture; adjustable means to introduce water from the supply pipe above said diaphragm, and means operable from the outside of said valve to lift said plunger-pin to discharge the water above said diaphragm into said discharge pipe.

4. In a flush-valve, the combination of a valve-body having an inlet pipe and a discharge pipe; a cover for said body; a diaphragm positioned intermediate said body and cover; a container for air and water in communication with said valve; a supply tube adapted to supply water to said container indirectly by first discharging said water into said valve; a valve-disc positioned on the lower side of said diaphragm; a seat for said disc; a plug adapted to secure said disc to said diaphragm; said plug having a central aperture; a plunger-pin loosely slidable in said aperture; adjustable means to introduce water from the supply-pipe above said diaphragm, and lifting means operable from the outside of said valve adapted to lift said plunger-pin a definite amount and release same thereafter; said lifting means comprising a lever having a hinged finger adapted to engage said plunger-pin.

5. In a flush-valve, the combination of a valve body comprising an upper and a lower compartment; an inlet pipe and a discharge pipe positioned on said body; a cover for said valve body; a diaphragm positioned intermediate said body and cover; a container for air and water in communication with said valve; an inlet-tube positioned within said inlet pipe and adapted to supply water to said container indirectly by first discharging said water in the upper compartment of said valve body; a discharge valve positioned in said body and adapted to discharge the water in said container and inlet tube into said discharge pipe; said discharge valve comprising a valve disc positioned on the lower side of said diaphragm and a guide-sleeve having a plurality of apertures adapted to discharge water therethrough; a hub having a central aperture slidably engaged by said guide-sleeve and adapted to form a seat for said valve disc; a plug adapted to secure said valve disc and guide-sleeve to said diaphragm; said plug having a central aperture; a plunger-pin loosely slidable in said plug-aperture and having a head adapted to close said aperture; adjustable means to introduce water from the inlet-tube above said diaphragm, and lifting means operable from the outside of said valve-body to lift said plunger-pin to discharge the water above said diaphragm into said discharge pipe.

In testimony whereof I affix my signature.

JOHN B. PAUL.